United States Patent [19]

Koizumi et al.

[11] Patent Number: 4,843,492

[45] Date of Patent: * Jun. 27, 1989

[54] AUTOMATIC CASSETTE TAPE RECORDER STOP MECHANISM FOR USE WITH A PLURALITY OF TAPES

[75] Inventors: Satoru Koizumi; Daisuke Teshima; Yoshio Katayama, all of HigashiHiroshima, Japan

[73] Assignee: Sharp Kabushiki Kaisha, Osaka, Japan

[ * ] Notice: The portion of the term of this patent subsequent to Oct. 6, 2004 has been disclaimed.

[21] Appl. No.: 71,173

[22] Filed: Jul. 8, 1987

Related U.S. Application Data

[63] Continuation of Ser. No. 851,465, Apr. 14, 1986, Pat. No. 4,698,704.

[30] Foreign Application Priority Data

Apr. 17, 1985 [JP] Japan ................................. 60-57120

[51] Int. Cl.⁴ ............................................. G11B 15/22
[52] U.S. Cl. .................................... 360/74.1; 360/74.3
[58] Field of Search ...................... 360/74.1, 74.3, 74.2

[56] References Cited

U.S. PATENT DOCUMENTS

| 4,118,744 | 10/1978 | Sato ..................................... 360/74.2 |
| 4,309,729 | 1/1082 | Kice ..................................... 360/74.2 |
| 4,698,704 | 10/1987 | Koizumi et al. .................... 360/74.1 |

FOREIGN PATENT DOCUMENTS 2316090 10/1974 Fed. Rep. of Germany .
2524219 12/1976 Fed. Rep. of Germany .
3151455 7/1982 Fed. Rep. of Germany .

Primary Examiner—Alan Faber
Assistant Examiner—Surinder Sachar
Attorney, Agent, or Firm—Birch, Stewart, Kolasch & Birch

[57] ABSTRACT

An automatic cassette tape recorder stop apparatus which can drive a plurality of magnetic tapes simultaneously or individually and includes a sensor for each of the tapes; and a lock release block which receives the load applied to each sensor, rotates a trigger lever through a conversion lever, and actuates a cam gear, a lock release plate and a lock plate. The automatic stop apparatus further includes a load-receiving resilient member for each sensor which does not allow the load on the sensor to be transmitted to the trigger lever while the tape is running but allows the load to be transmitted to the trigger lever for its rotation when the tape has been wound to the end.

6 Claims, 2 Drawing Sheets

AUTOMATIC CASSETTE TAPE RECORDER STOP MECHANISM FOR USE WITH A PLURALITY OF TAPES

This application is a continuation of copending application Ser. No. 851,465, filed on Apr. 14, 1986 now Pat. No. 4,698,704.

BACKGROUND OF THE INVENTION

The present invention relates to an automatic cassette tape recorder stop mechanism or more specifically to an automatic stop mechanism in a cassette tape recorder in which at least two tape cassettes can be operated simultaneously.

If an automatic stop mechanism is provided for each of a plurality of tape cassettes loaded in a tape recorder that can drive some or all of the tapes simultaneously, the number of parts involved increases, resulting in a cost rise. In contrast, if one automatic stop mechanism is shared among all the tape cassettes in such a tape recorder, the number of parts involved need not be increased. However, the load applied to the automatic stop mechanism varies greater depending upon whether the tape cassettes are driven individually or simultaneously. Such variation in the load can cause erroneous operation of the automatic stop mechanism.

SUMMARY OF THE INVENTION

An object of the present invention is to provide an automatic tape recorder stop mechanism which detects tape ends accurately regardless of the number of tape cassettes under operation and automatically stops the operation of the tape cassettes.

Another object of the present invention is to provide an automatic tape recorder stop mechanism which detects tape ends accurately to automatically stop the tape cassette operation regardless whether a plurality of tape cassettes are being operated individually or simultaneously.

Other objects and the further scope of the applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description. To achieve the above objects, an embodiment of an automatic stop device of the present invention for a tape recorder that can accommodate a plurality of magnetic tapes and drive them individually or two or more tapes simultaneously comprises a sensor lever provided for each of the plurality of magnetic tapes and a lock release block which receives the load applied to the sensor and transmits it through a conversion lever to a trigger lever for rotation, thus actuating a cam gear, a lock release plate and a lock plate. The load to the sensor is caused by the tension of the magnetic tape. Each sensor is provided with a load receiving resilient member which does not energize the trigger lever when the tape is running but energizes the trigger lever for rotation when the tape has been wound up to the end.

While the tape is running the load by the tension of the running tape onto the sensor lever is absorbed by the resilient member so that the trigger lever is not energized. When the tape has been wound to the end, the load caused by the tape tension is transmitted through the sensor lever to the trigger lever to rotate the same, thus unlocking the automatic stop mechanism to stop reproduction or recording operation of the tape recorder.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

An embodiment of the present invention is described below with reference to FIGS. 1 and 2. In this embodiment, the invention is applied to a double cassette tape recorder in which two tape cassettes are loaded. The invention may be applied to a cassette tape recorder designed for loading three or more tape cassettes. The tape recorder related to the present invention is capable of operating the plurality of loaded tape cassettes individually or some or all of them simultaneously.

Figure 1:
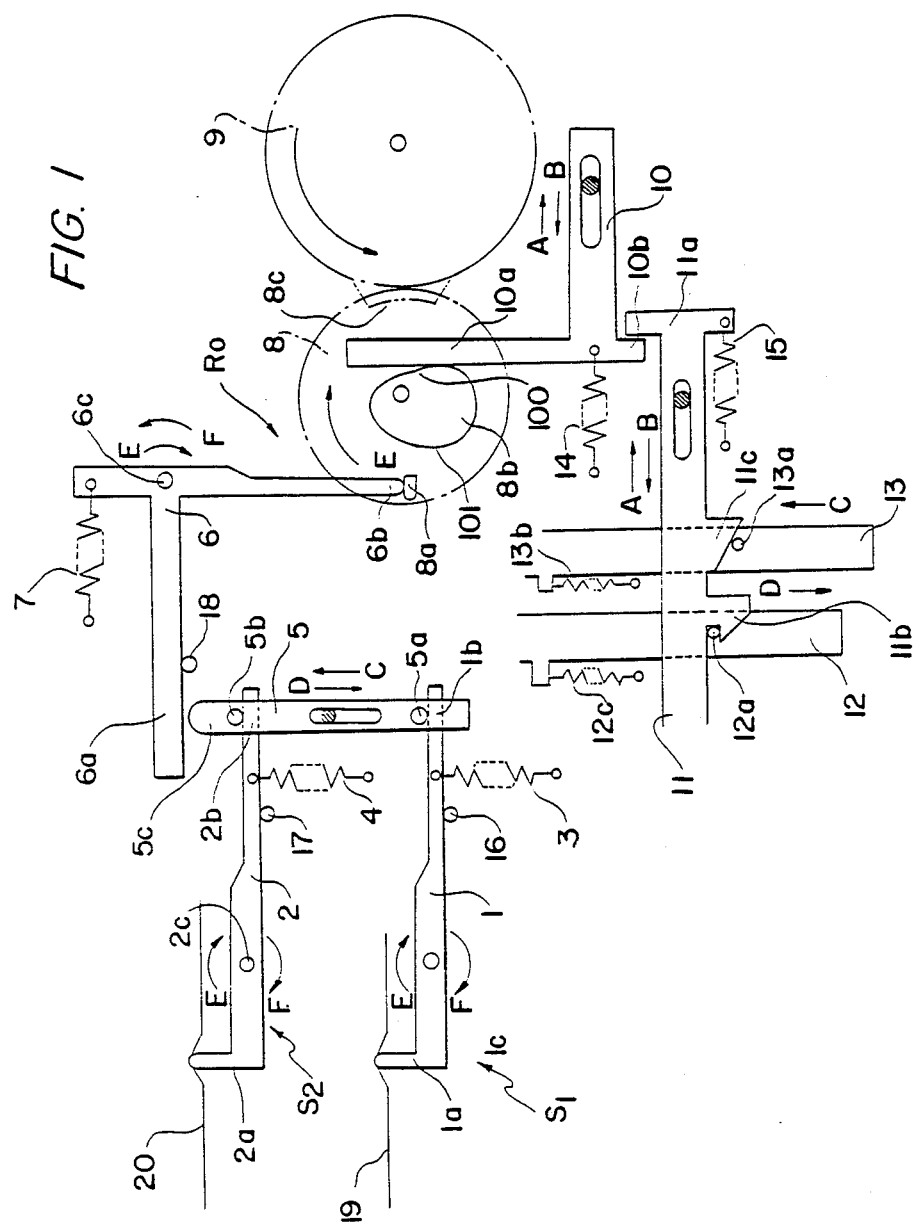
FIG. 1 is a plan view of an embodiment of an automatic stop mechanism of the present invention for use in a double cassette tape recorder.
Figure 2:
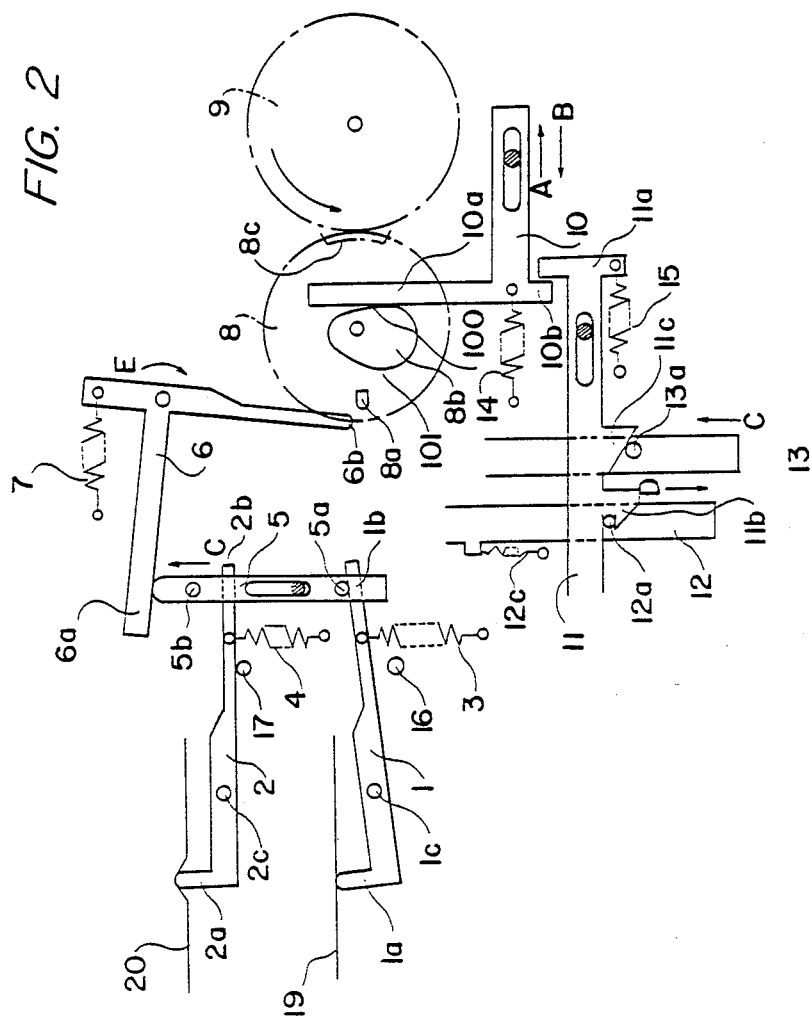
FIG. 2 is a plan view showing the operation mode of the automatic stop mechanism of FIG. 1.

Referring to FIG. 1, the automatic stop mechanism of the present invention comprises sensor blocks S1 and S2 provided for the respective tape cassettes loaded in the tape recorder and a lock release block R0 which transmits the load applied to the sensor blocks S1 and S2 to operation levers 12 and 13 via a conversion lever 5, trigger lever 6, cam gear 8, lock release plate 10 and lock plate 11.

As shown, the sensor blocks S1 and S2 comprise inverted L-shaped sensor levers 1 and 2 that have tape receivers 1a and 2a in contact with No. 1 and No. 2 magnetic tapes 19 and 20, respectively. The No. 1 and No. 2 sensor levers 1 and 2 are arranged in parallel to each other and rotatable around axes 1c and 2c, respectively.

The sensor levers 1 and 2 have arms 1b and 2b on the opposite ends from the tape receivers 1a and 2a, respectively. A conversion lever 5 is mounted crossing the arms 1b and 2b. The conversion lever 5 includes an elongated hole into which a pin is inserted so that is can move at right angle (in directions indicated by C and D) to the sensor levers 1 and 2.

The conversion lever 5 has pins 5a and 5b in contact with the sensor levers 1 and 2 respectively, so as to enable the conversion lever 5 to shift in the direction C or D as the sensor lever 1 or 2 rotates.

T-shaped trigger lever 6 is mounted with its leg 6a approximately, perpendicularly kept in contact with an end 5c of the conversion lever 5. The trigger lever 6 is rotatable in the direction E or F around a pin 6c mounted at the joint of the leg 6a and two arms of the trigger lever 6. A spring 7 is connected to one of the arms of the trigger lever 6, biasing the trigger lever to rotate in the direction F. Excessive rotation in the direction F is prevented by a pin 18. The spring 7 thus forces the conversion lever 5 toward the direction D and the sensor levers 1 and 2 rotation in the direction E.

Resilient members 3 and 4 are connected to the main bodies of the No. 1 and No. 2 sensor levers 1 and 2, respectively, biasing the sensor levers 1 and 2 to rotate in the direction E around the axes 1c and 2c, respectively. The rotation of the sensor levers 1 and 2 in the direction E is limited by pins 16 and 17, respectively.

The other arm of the trigger lever 6 serves as a trigger 6b. In the normal position with the leg 6a in contact with the pin 18, the end of the trigger 6b comes in contact with a projection 8a formed on a flat face of a cam gear 8, preventing the cam gear 8 from rotation in the direction E. The cam gear 8 is integrally and coaxially formed with a cam 8b and includes a portion without teeth 8c. The cam gear 8 is rotatable in the direction E when it is engaged with a driving gear. In the normal position with the leg 6a of the trigger lever 6 in contact with the pin 18, since the trigger 6b comes in contact with the projection 8a and the portion without teeth 8c of the cam gear 8 faces the driving gear 9, the cam gear 8 does not rotate with the driving gear 9.

The cam gear 8 is temporarily rotated in the direction E by a lock release plate 10. The T-shaped lock release plate 10 which is slidable in the direction A or B is pulled in the direction B by a spring 14, so that an arm 10a of the lock release plate 10 presses the descending cam face poriton 100 of the cam 8b, forcing the cam 8b and therefore the cam gear 8 to rotate in the direction E. While the No. 1 tape 19 and/or No. 2 tape 20 are running, however, the trigger 6b is engaged with the projection 8a on the cam gear 8, preventing the cam gear 8 from being rotated by the lock release plate 10. When the No. 1 tape 19 and/or No. 2 tape 20 are wound to the ends, the trigger 6b of the trigger lever 6 is released from engagement with the projection 8a on the cam gear 8. Then, the descending cam face portion 100 of the cam 8b is pushed by the lock release plate 10 so that the cam gear 8 rotates in the direction E. By this rotation, the driving gear 9 comes in engagement with the teeth of the cam gear 8, driving the cam gear 8 for an approximate full turn. As the cam gear 8 rotates, the rising cam face portion 101 of the cam 8b faces and pushes the arm 10a of the lock release plate 10. Thus, the lock release plate 10 moves in the direction A against the force of the spring 14.

When the projection 8a on the cam gear 8 is released from engagement with the trigger 6a and when the cam 8b is allowed to rotate, forcing the lock release plate 10 toward the direction A, a lock plate 11 forced in the direction B by a spring 15 is moved in the direction A with a projection 11a of the lock plate 11 being engaged with the other arm 10b of the lock release plate 10.

A lever 12 is so constructed as to actuate reproduction or recording operation. The lever 12 is provided with a pin 12a which is engageable with the lock plate 11 for locking the lever 12. When the lever 12 is pushed in the direction C, the pin 12a comes in engagement with a lock 11b of the lock plate 11. In this state, reproduction or recording of the tape is initiated. When the lock plate 11 moves in the direction A, the pin 12a is released from engagement with the lock 11b of the lock plate 11, so that the lever 12 energized by a spring 12c is allowed to move in the direction D, thus stopping reproduction or recording operation of the tape recorder.

A lever 13 is an ordinary operation stop lever and provided with a pin 13a which engages with the lock plate 11 for moving the lock plate 11. If the lever 13 is pressed against a spring 13b while the pin 12a of the lever 12 is locked by the lock 11b of the lock plate 11, the pin 13a of the lever 13 comes in contact with the inclined face of the projection 11c of the lock plate 11, forcing the lock plate 11 toward the direction A. As a result, the pin 12a of the lever 12 is unlocked from the lock 11b of the lock plate 11.

The resilient members 3 and 4 absorb the load (turning effect for the sensor levers 1 and 2) on the tape receivers 1a and 1b caused by the tension of the running tapes. Therefore, the load caused by the tapes does not affect the trigger lever 6 while the tapes are running. However, when the tapes have been wound to the ends, the load applied by the large tension of the tapes onto the tape receivers 1a and 2a overcomes the force of the resilient members 3 and 4 and spring 7, so that the trigger lever 6 is allowed to rotate in the direction E. In other words, the resilient members 3 and 4 have spring forces large enough to overcome the respective tension loads of the running tapes. The spring 7 has such a force that the sum of forces of the resilient member 3 or 4 and spring 7 is smaller than the load caused by the tape tension when the tape has been wound up to the end.

With the above construction, when either of the tapes, say, No. 1 tape 19 has been wound to the end, the load applied on the No. 1 sensor lever 1 exceeds the sum of the forces of the resilient member 3 and spring 7. Accordingly, the conversion lever 5 shifts in the direction C, causing the trigger lever 6 to rotate in the direction E as shown in FIG. 2. Engagement between the projection 8a of the cam gear 8 and the trigger 6b is thus released. Then, the cam 8b pressed in the direction B by the arm 10a of the lock release plate 10 rotates to the lowest position of its downward stroke so that the cam gear 8 rotates together with the cam 8b and comes in engagement with the driving gear 9. The cam gear 8 provides an approximate full turn until the portion without teeth 8c of the cam gear 8 faces the driving gear 9 again. During the upward stroke of the cam 8b while the cam gear 8 is rotating, the cam 8b pushes the lock release plate 10 in the direction A so that the lock plate 11 is also shifted in the direction A. As a result, the lever 12 moves in the direction D, stopping reproduction or recording operation.

As described above, the automatic cassette tape recorder stop mechanism of the present invention comprises the sensor for each of the plurality of cassette tapes the lock release block which receives the load applied by the tape to the sensor and transmits it through the conversion lever to the trigger lever for rotation so as to actuate the cam gear, lock release plate and then lock plate; and the load receiving resilient member provided for each sensor. The load receiving member has such a force that it absorbs the load on the sensor and therefore does not actuate the trigger lever when the tape is running, but it cannot absorb the load when the tape has been wound to the end, allowing the trigger lever to rotate. Consequently, the automatic stop mechanism of the present invention operates properly at all times irrespective of the number of running tape cassettes. Moreover, the automatic stop mechanism of the present invention involves smaller number of parts, has a simpler construction, and can be manufactured at a lower cost than the conventional single type automatic stop mechanism.

While only certain embodiments of the present invention have been described, it will be apparent to those skilled in the art that various changes and modifications may be made therein without departing from the spirit and scope of the present invention as claimed.

What is claimed is:

1. In a tape recorder capable of accommodating a plurality of magnetic tapes and driving each tape individually or two or more tapes simultaneously, an automatic stop apparatus for automatically stopping the magnetic tape operation, comprising:
   lock means which is locked when at least one tape is being driven;
   sensor means provided for each of the tapes to detect the state of the tape;
   means for unlocking said lock means to stop the tape operation in response to the output of said sensor means;
   said unlocking means including a single trigger member provided for all of said plurality of magnetic tapes to stop the operation of the tape recorder in response to the tape end detecting output of said sensor means; and
   output prohibiting means provided for each of the sensor means to prevent the output of said sensor means from being transmitted to said unlocking means when the tape is running.

2. The automatic stop apparatus as claimed in claim 1 wherein said sensor means detects the end of the tape when the tape under operation has been wound to the end, and gives output to said unlocking means in spite of said output prohibiting means.

3. The automatic stop apparatus as claimed in claim 1 wherein said lock means indicates the driving state of the tapes in such a way that the lock means when locked indicates that at least one of the tapes are being driven and the lock means when unlocked indicates that none of the tapes are being driven.

4. The automatic stop apparatus as claimed in claim 1, wherein said sensor means comprises a load receiving portion on which load is applied according to the tape tension, a load transfer portion for transmitting the load to said unlocking means, and a certain level load transfer prohibiting portion which is restricted by said output prohibiting means so that load is not transmitted from said load transfer portion to said unlocking means when load applied to said load receiving portion is smaller than a certain level.

5. In a tape recorder capable of accommodating a plurality of magnetic tapes and driving each tape individually or two or more tapes simultaneously, an automatic stop apparatus for automatically stopping the magnetic tape operation, comprising:
   lock means which is locked when at least one tape is being driven;
   sensor means provided for each of the tapes to detect the state of the tape;
   means for unlocking said lock means to stop the tape operation in response to the output of said sensor means; said unlocking means including a lever which is acted on independently by each said sensor means and a trigger lever which is acted on by said lever; and
   output prohibiting means provided for each of the sensor means to prevent the output of said sensor means from being transmitted to said unlocking means when the tape is running.

6. In a tape recorder capable of accommodating a plurality of magnetic tapes and driving each tape individually or two or more tapes simultaneously, an automatic stop apparatus for automatically stopping the magnetic tape operation, comprising:
   lock means which is locked when at least one tape is being driven;
   sensor means provided for each of the tapes to detect the state of the tape;
   means for unlocking said lock means to stop the tape operation in response to the output of said sensor means;
   output prohibiting means provided for each of the sensor means to prevent the output of said sensor means from being transmitted to said unlocking means when the tape is running;
   said unlocking means comprises a drive gear for providing a turning effect, a gear having a portion without teeth and rotatable interlockingly with the drive gear, a lock release lever for said lock means, a cam mounted on said gear, a stopper provided on said gear, and a trigger which is engaged with or disengaged from said stopper according to the output of said sensor means, said lock release lever being shifted because of the cam shape when engagement between said trigger and stopper is released, and releasing the lock means before said gear has made an approximate full turn.

* * * * *